United States Patent
Rice et al.

[11] Patent Number: 6,145,912
[45] Date of Patent: Nov. 14, 2000

[54] RECREATIONAL VEHICLE COUCH MOUNTING ASSEMBLY

[75] Inventors: Dennis A. Rice; Patrick J. Maas, both of Dubuque, Iowa

[73] Assignee: Flexsteel Industries, Inc., Dubuque, Iowa

[21] Appl. No.: 09/201,451

[22] Filed: Nov. 30, 1998

Related U.S. Application Data

[60] Provisional application No. 60/069,469, Dec. 15, 1997.

[51] Int. Cl.[7] .................................................. B60N 2/005
[52] U.S. Cl. ...................................... 296/65.03; 248/503.1
[58] Field of Search .................................... 296/63, 65.01, 296/65.03; 248/503.1; 297/344.1

[56] References Cited

U.S. PATENT DOCUMENTS

| | | |
|---|---|---|
| 4,277,043 | 7/1981 | Weik .................................... 248/503.1 |
| 4,376,522 | 3/1983 | Banks ................................... 248/503.1 |
| 4,436,270 | 3/1984 | Muraishi ................................. 248/416 |
| 4,645,166 | 2/1987 | Checkley et al. ..................... 248/503.1 |
| 4,789,126 | 12/1988 | Rice et al. ............................ 248/503.1 |
| 4,805,952 | 2/1989 | Coleman ................................ 296/65.1 |
| 4,955,575 | 9/1990 | Moore ..................................... 248/398 |
| 4,978,097 | 12/1990 | Froutzis ................................ 248/503.1 |
| 5,125,711 | 6/1992 | Syed et al. .............................. 296/68.1 |
| 5,372,398 | 12/1994 | Aneiros et al. ......................... 296/65.1 |
| 5,527,080 | 6/1996 | Wahlqvist ................................. 296/63 |
| 5,562,322 | 10/1996 | Christoffel .............................. 296/65.1 |

*Primary Examiner*—Dennis H. Pedder
*Attorney, Agent, or Firm*—Lee, Mann, Smith, McWilliams, Sweeney & Ohlson

[57] ABSTRACT

A locking mechanism for a couch style vehicle seat uses mating channels on the floor and on the leg assembly with a front locking portion enabling tilting for removable and refitting, and have a rotating locking mechanism tailored to the load needs of a couch style vehicle seat.

16 Claims, 4 Drawing Sheets

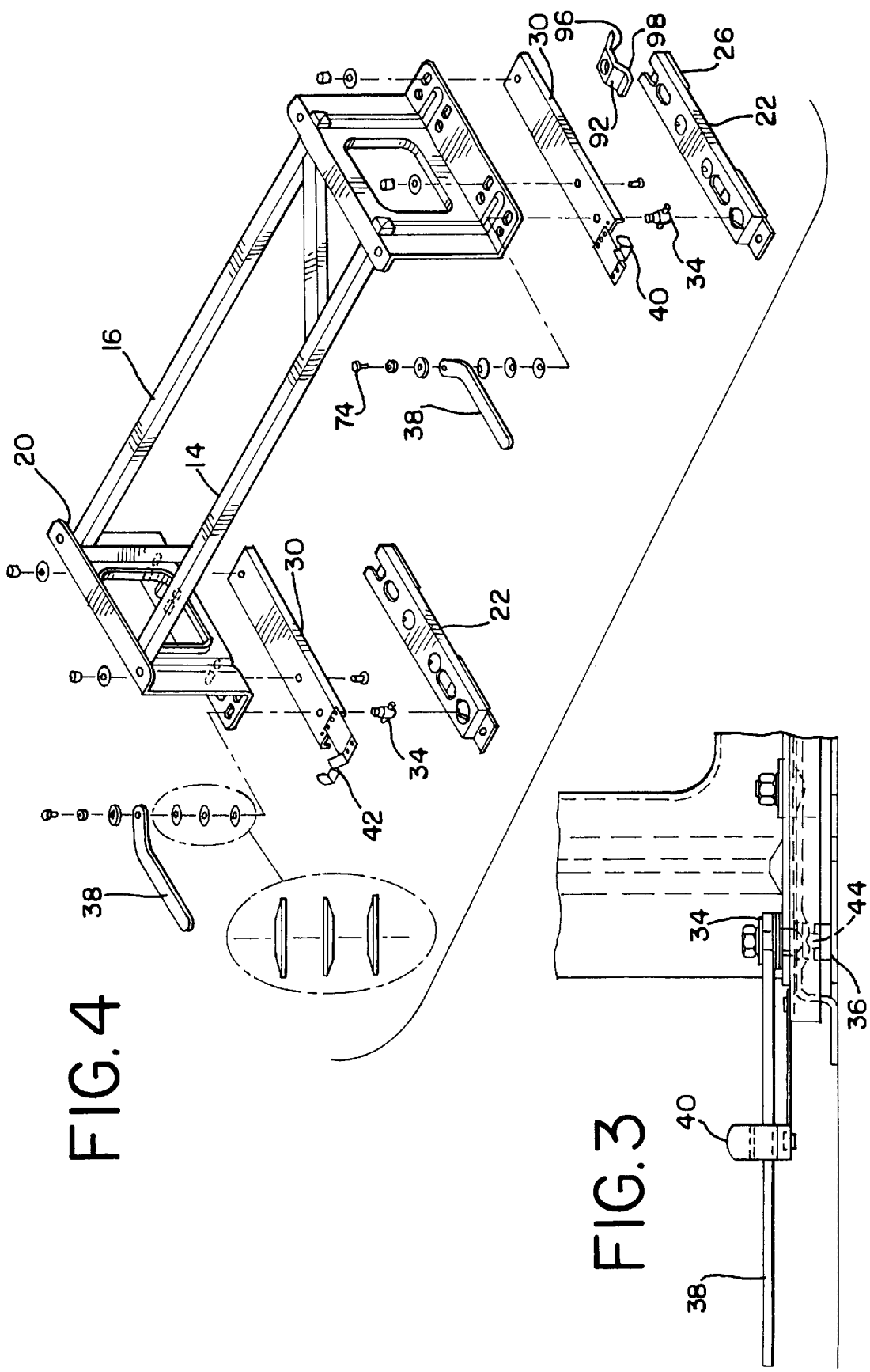

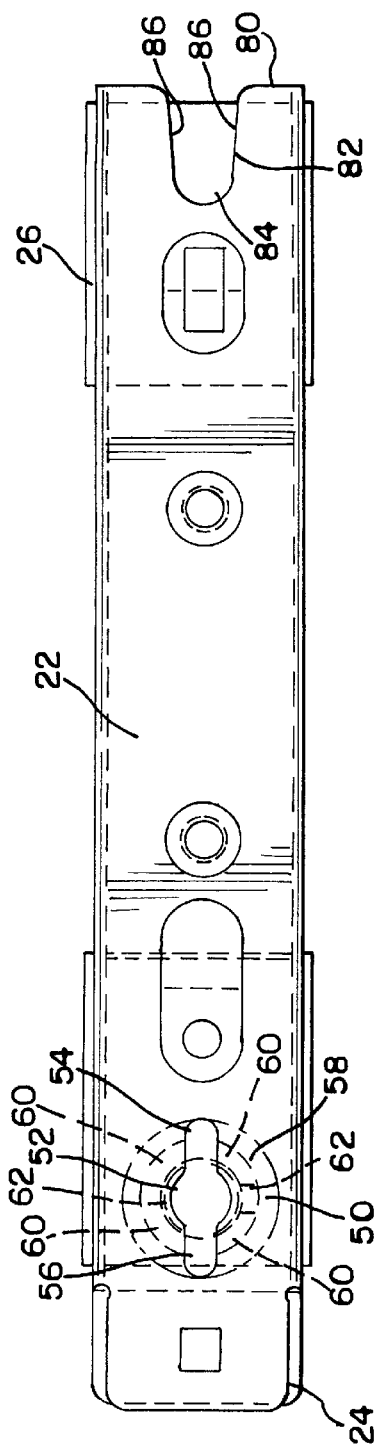
FIG.5
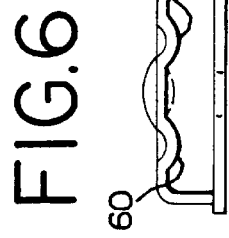
FIG.6
FIG.7
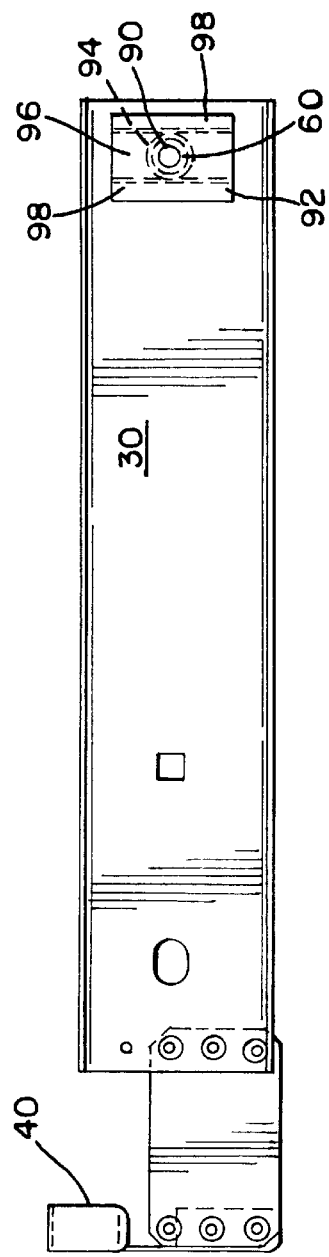
FIG.8

RECREATIONAL VEHICLE COUCH MOUNTING ASSEMBLY

RELATED APPLICATION

This application claims priority based on Provisional Application Ser. No. 60/069,469, filed Dec. 15, 1997.

BACKGROUND OF THE INVENTION

A variety of latches and locking mechanisms have been used in connection with recreational vehicle seats to enable secure locking to the vehicle, removable without tools and to achieve a level of standardization so that seats can be adapted to a variety of vans, are economically manufactured, easily installed, and readily serviced, and the like.

Couch style seating in a van or recreational vehicle is particularly problematic because of the greater loads imposed thereon by the seating of two or three persons, differential loads when the seat is partially, but not fully occupied, the lever arm imposed by load and movement, and finally, the size and weight of a couch style seat imposing loads on the base much different than those on, for example, a pedestal style seat.

SUMMARY OF THE INVENTION

The invention utilizes a floor channel mounted on a vehicle floor with a leg channel lockably engageable thereon. The front of the leg channel has a leg clamp which engages a locking recess or slot in the front web of the floor channel. As the front of a tilted seat assembly is installed and engages the floor channel, it is then tilted rearwardly to a horizontal position. A spring loaded lock pin then fits into a double keyhole aperture. As the lock pin is turned by a lever, transverse pins bear on a ramp and the detent portion around the periphery of the slot, finally engaging pin lock portions. This locking arrangement is referred to sometimes as a lock pin assembly.

In this manner, the leg assembly with spring loaded lock pin assembly can engage the floor assembly. When the spring loaded lock pin assembly is rotated into locking engagement with the lever, the lever is locked in place in a spring clip.

To remove, the lever can be reversed and rotated ninety degrees (90°) to a release position and the couch tilted forward. The couch can then be displaced an additional distance horizontally forward for a complete removal from the vehicle.

BRIEF DESCRIPTION OF THE DRAWINGS

FIG. 3 shows the mounting assembly with the lever in the locked position.

FIG. 4 is an exploded perspective view showing a pair of mounting assemblies, leg assemblies, and couch base assembly.

FIG. 5 is a top plan view of a floor channel.

FIG. 6 is a rear elevational view of a floor channel.

FIG. 7 is a sectional view of the double keyhole opening and locking ramp on the floor channel.

FIG. 8 is a bottom plan view of a leg channel.

DETAILED DESCRIPTION OF THE DRAWINGS

Figure 1:
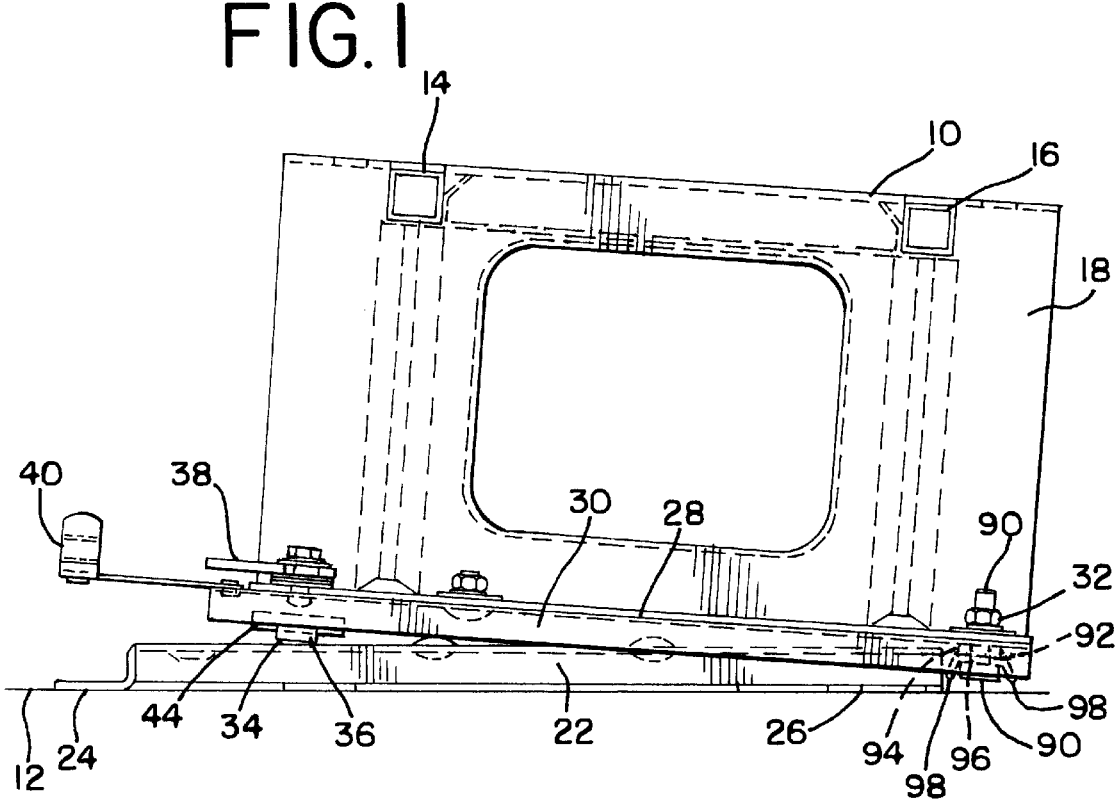
FIG. 1 is a right side elevational view of the mounting assembly in a released position.

A vehicle couch seat base assembly 10 is mounted to a vehicle floor 12. The seat base assembly uses cross bars 14, 16 interconnecting right leg 18 and left leg 20. The legs are also referred to from time-to-time as a passenger side leg 18 and driver side leg 20. These terms are applied here for clarity but, in fact, are somewhat relative as in certain installations a couch could be installed in a rear facing or even side facing manner as in certain recreational vehicles.

A floor channel 22 is affixed to floor 12. Preferably, bolts would be used for easy adaptation to a variety of standard vehicle bolt hole patterns, however, modes of affixation such as by welding, integrally forming in a floor, the use of other fasteners such as studs with nuts or rivets could all be suitable in appropriate cases. Floor channel 22 has flange 24 and web 26 adjacent floor 12 thereby enabling the through bolting thereof Leg channel assembly 28 includes leg channel 30 with leg clamp assembly 32 at a first end and lock mechanism 34 at an opposite end. Lock cylinder 36 is rotated by actuating lever or locking handle 38. When locked, handle 38 fits in spring clip 40 on the passenger's side and corresponding driver's side configured spring clip 42. The rotation of lever or handle 38 and cylinder 36 rotates transverse locking pin 44 locking channel assembly 30 to floor channel 22 as will be more fully described below.

Figure 2:
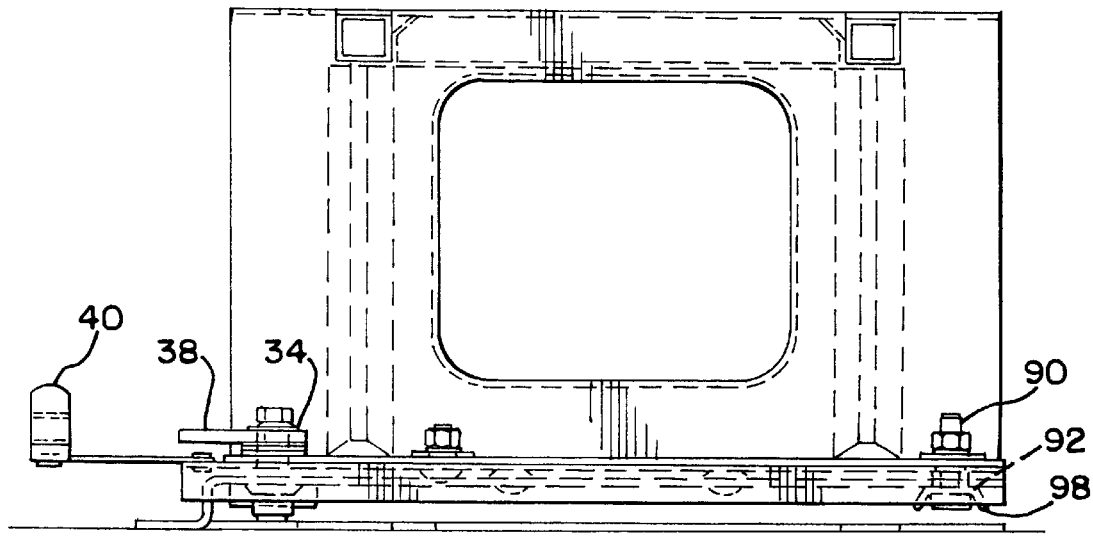
FIG. 2 is a right side elevational view of the mounting assembly in a horizontal but unlocked position.
Figure 9:
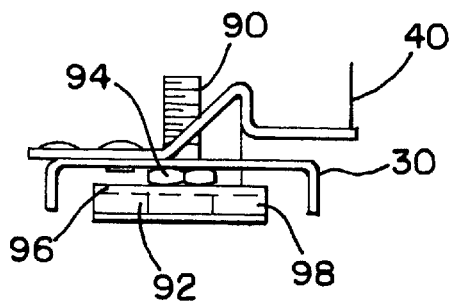
FIG. 9 is a rear elevational view of a leg channel.

FIG. 1 shows the unlocked lock mechanism 34 and seat base assembly 10 rotated about a transverse axis so as to fully disengage lock mechanism 34 and leg channel assembly 28. Channel 30 is lifted from channel 22 enabling leg clamp assembly 32 to be disengaged from floor channel 22. FIG. 2 shows the assembly in a horizontal, but unlocked state.

FIG. 3 shows lock handle 38 rotated into the locked position and engaged in clip 40. It will be seen in connection with FIG. 3 that pin 44 in cylinder 36 is rotated from an open position (FIG. 2, FIG. 1), to a locked position. Double keyhole aperture, indicated generally by reference numeral 50, (FIG. 5) has a generally circular center portion 52 with two opposed slots 54,56. Around the circumference is formed ramp 58 which includes a plurality of lead-in portions 60 and locking portion 62. Preferably these are formed as a smooth ramp in final tooling. Portions 60 taper gradually away from respective slots 54, 56 leading to locking portion 62 providing a gradual transition thereto. Portions 60 provide a gradual ramping effect with minimal friction and a gradual locking commensurate with the greater dimensions and loads on a couch type vehicle seat. The smooth ramping effect improves the ease of operation and promotes even wear and consistent friction in the operation of the hand.

Figure 10:
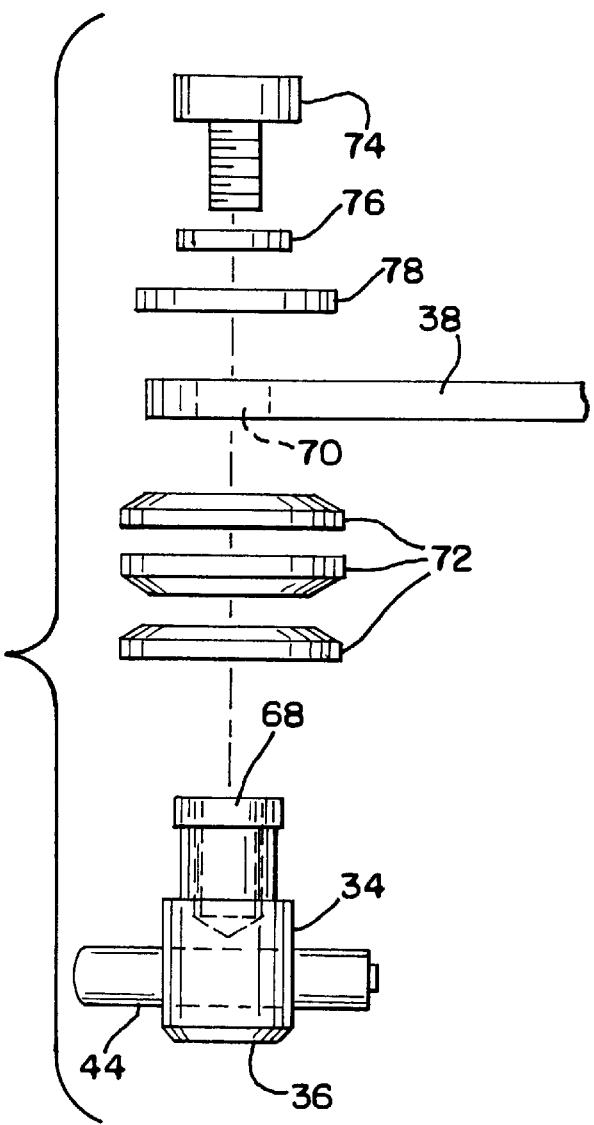
FIG. 10 is an exploded view of the lock pin assembly.
Figure 11:
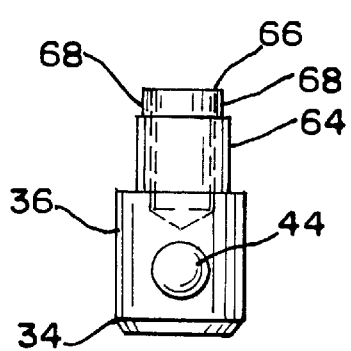
FIG. 11 is a right side elevational view of the lock mechanism.
Figure 12:
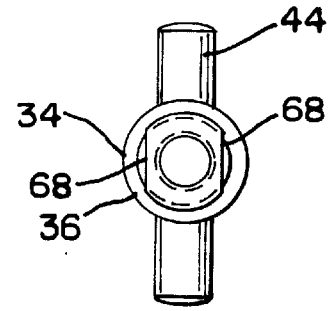
FIG. 12 is a top plan view of the lock mechanism.

Aperture 50 receives lock mechanism 34. Central portion 52 receives cylinder 36 and in the release position, slots 54, 56 receive transverse pin 44. Shank 64 extends upwardly from cylinder 36 and has a narrowed lock portion 66 formed to have shoulders 68 which receive a corresponding aperture 70 in handle 38. Handle 38 bears against conical spring washers 72 arranged as shown in FIG. 10. Handle 38 is fixed in place through fastener 74 acting on lock washer 76, in turn on flat washer 78. Other conventional fastening means will be apparent to one of ordinary skill so long as handle 38 is rotationally fixed relative to transverse pin 44.

End 80 of channel 22 opposite flange 24 is locking slot 82. Locking slot 82, it will be noted, has a generally semi-circular terminal portion 84 with converging walls 86 leading thereto. Slot 82, defined by walls 86 and portion 84, receives leg clamp assembly 32 preferably with fastener 90 fixing clamp member 92 against outwardly cylindrically sectioned spacer 94. Clamp member 92 includes a central web 96 and two downwardly depending inclined edges 98.

Accordingly, it will be seen that inclined edges 98 can be used to direct the forward portion of leg channel into contact with end 80 of floor channel 22. The angle of edge 98 in conjunction with walls 86 will tend to center and locate the seat assembly 10 and greatly facilitate the aligning of lock mechanism 34 with aperture 50, the precision of alignment of which greatly facilitates the locking of a substantially large and relatively heavy seat assembly by a user in a van or recreational vehicle.

As lock mechanism 34 is rotated through rotation of handle 38, pin 44 bears on portions 60 loading leg channel assembly 28 until pin 44 engages the locking portions 62 at which time the load on channel assembly 28 will resist disengagement of pin 44 from locking portion 62. Handle 38, being on the driver's side, is a mirror image of, and owing to the symmetricity of handle 38, an identically manufactured component as the handle on the passenger's side. Handle 38 engages in respective spring clip 40 on the passenger's side or corresponding driver side spring clip 42. The main difference in the spring clips owes to the proximity of the handle to the wall of the vehicle and need for passenger clearance there past in a vehicle passenger ingress or egress passageway.

While the present invention has been disclosed and described with reference to a single embodiment thereof, it will be apparent, as noted above that variations and modifications maybe made therein. It is, thus, intended in the following claims to cover each variation and modification that falls within the true spirit and scope of the present invention.

What is claimed is:

1. A locking mechanism for releasably attaching a couch style vehicle seat assembly to a vehicle floor, the seat having first and second spaced legs extending from a seating surface to respective first and second lower ends, comprising:

a first floor channel mounted on the vehicle floor, said first floor channel having a front web, a locking recess being formed in said front web of said floor channel, said floor channel having a first front and a first rear;

a first leg channel at the lower end lockably engageable to said first floor channel, said first leg channel having a first front and a first rear;

a second floor channel mounted on the vehicle floor, said second floor channel having a second front web, a second locking recess being formed in said second front web of said second floor channel, said second floor channel having a second front and a second rear;

a second leg channel at the lower end lockably engageable to said second floor channel, the second leg channel having a second front and a second rear;

said front of said first leg channel has a first leg clamp mounted thereto which first leg clamp engages said first locking recess;

said front of said second leg channel has a second leg clamp mounted thereto which second leg clamp engages said second locking recess;

a first lock pin assembly rotatably mounted to the rear of said first leg channel;

a first aperture for receiving said first lock pin assembly being formed at said rear of said first floor channel;

a second lock pin assembly rotatably mounted to the second rear of said second leg channel;

a second aperture for receiving said second lock pin assembly being formed at said rear of said second floor channel;

said first and second leg channel locking recesses, first and second leg clamps, first and second apertures and first and second lock pin assemblies coacting so that as the first and second leg clamps of a tilted seat assembly are moved rearwardly and engage the first second locking recesses, respectively, and said seat assembly is then tilted rearwardly to a horizontal position, said first and second lock pin assemblies engage said first and second apertures, respectively, and rotating said first and second lock pin assemblies within said first and second apertures locks said seat assembly to said floor when locked, in a stable manner secured on opposite first and second sides.

2. A locking mechanism for releasably attaching a couch style vehicle seat assembly to a vehicle floor, the seat having first and second spaced legs extending from a seating surface to respective first and second lower ends, comprising:

a floor channel mounted on the vehicle floor, said floor channel having a front web, a locking recess being formed in said front web of said floor channel, said floor channel having a front and a rear;

a leg channel at the lower end lockably engageable to said floor channel, the leg channel having a front and a rear;

said front of said leg channel has a leg clamp mounted thereto which leg clamp engages said locking recess;

a lock pin assembly rotatably mounted to the rear of said leg channel;

an aperture for receiving said lock pin assembly being formed at said rear of said floor channel;

said leg channel locking recess, leg clamp, aperture and lock pin assembly coacting so that as the leg clamp of a tilted seat assembly is installed and engages the locking recess, and said seat assembly is then tilted rearwardly to a horizontal position, said lock pin assembly engages said aperture, and rotating said lock pin assembly within said aperture locks said seat assembly to said floor.

3. The locking mechanism of claim 2 further comprising:

said lock pin assembly has a spring loaded lock pin;

said aperture comprises a double keyhole aperture;

said lock pin is affixed to and adapted to be turned by a lever;

as said lever turns, transverse pins extending outwardly from said lock pin assembly bear on a ramp around the periphery of the slot, said pins engaging pin lock portions thereby locking said seat assembly to said floor.

4. The locking mechanism of claim 2 further comprising:

said locking mechanism comprising a first locking mechanism;

said first locking mechanism being formed and arranged at said first lower end of said first leg;

a second locking mechanism being formed and arranged at said second lower end of said second leg;

said second locking mechanism having a second floor channel mounted on the vehicle floor, said second floor channel having a second front web, a second locking recess being formed in said second front web of said second floor channel, said second floor channel having a front and a rear;

a second leg channel at the lower end lockably engageable to said second floor channel, the second leg channel having a front and a rear;

said front of said second leg channel has a second leg clamp mounted thereto which second leg clamp engages said second locking recess;

a second lock pin assembly rotatably mounted to the rear of said second leg channel;

a second aperture for receiving said second lock pin assembly being formed at said rear of said second floor channel;

said second leg channel locking recess, second leg clamp, second aperture and second lock pin assembly coacting so that as the second leg clamp of a tilted seat assembly is installed and engages the second locking recess, and said seat assembly is then tilted rearwardly to a horizontal position, said second lock pin assembly engages said second aperture, and rotating said second lock pin assembly within said second aperture locks said seat assembly to said floor;

said second locking assembly cooperating with said first locking assembly to affix said seating assembly to said floor, when locked, in a stable manner secured on opposite first and second sides.

5. The locking mechanism of claim 4 further comprising:

said first lock pin assembly has a first spring loaded lock pin;

said first aperture comprises a double keyhole aperture;

said first lock pin is affixed to and adapted to be turned by a first lever;

as said first lever turns, first transverse pins extending outwardly from said first lock pin assembly bear on a first ramp around the periphery of the first slot, said first pins engaging first pin lock portions;

said second lock pin assembly has a second spring loaded lock pin;

said second aperture comprises a double keyhole aperture;

said second lock pin is affixed to and adapted to be turned by a second lever;

as said second lever turns, second transverse pins extending outwardly from said second lock pin assembly bear on a second ramp around the periphery of the second slot, said second pins engaging second pin lock portions thereby locking said seat assembly to said floor.

6. The locking mechanism of claim 5 further comprising:

said first lever and said second lever rotating in opposite directions.

7. The locking mechanism of claim 2 further comprising:

a first web being located between said floor channel front and floor channel rear;

a second web being located between said leg channel front and leg channel rear;

said webs being brought in close proximity with one another when said lock pin assembly is engaged in a locked position.

8. The locking mechanism of claim 1, said first and second lock clamps further comprising:

each of said lock clamps having a central web;

each of said central webs having at least one sloped edge projecting therefrom and diverging towards the lock pin assembly.

9. The locking mechanism of claim 2, said lock clamp further comprising:

a central web;

at least one sloped edge projecting towards the lock pin assembly.

10. A locking mechanism for locking and unlocking a vehicle seat in a vehicle comprising:

said vehicle seat having a first side and a second side;

a first leg supporting said seat and a second leg supporting said seat and being spaced from said first leg;

said vehicle having a first floor channel and a second floor channel mounted therein;

each of said first and said second legs having a first leg channel and a second leg channel at the respective lower end thereof, each of said leg channels lockably engageable to each of said corresponding floor channels;

said first and second leg channels having a first leg clamp and a second leg clamp, respectively, mounted thereto at a first end thereof;

each of said first and second floor channels having a first locking recess and a second locking recess, respectively, formed therein at a first end thereof;

said first and second leg channels having a first lock pin assembly and a second lock pin assembly, respectively, mounted thereto at a second end thereof;

each of said first and second floor channels having a first lock pin receivable aperture and a second lock pin receivable aperture, respectively, formed therein at a second end thereof;

each of said leg clamps engages said locking recess and each of lock pin assemblies lockingly engageable with said apertures so that said seat is fastened in said vehicle by locking said lock pin assemblies.

11. The locking mechanism of claim 10 further comprising:

said first and second locking recesses substantially simultaneously receiving the first and second leg clamps of a tilted seat thereby providing clearance for operation of said lock pin assemblies;

said seat being tiltingly pivoted around said locking recess-leg clamp combination to engagement of said lock pin assemblies with said apertures;

said first and second lock pin assemblies having first and second levers, respectively, for rotatably actuating the lock pin assembly;

said seat being locked in position in said vehicle by the rotation of said levers.

12. The locking mechanism of claim 9 further comprising:

said first lever rotating in a first direction for locking;

said second lever rotating in a second direction for locking;

said first direction being opposite said second direction.

13. The locking mechanism of claim 10 further comprising:

said vehicle having a longitudinal axis;

said levers each having a primary axis;

said axes being parallel when said levers are stowed in a locked position.

14. The locking mechanism of claim 10, said first and second lock clamps further comprising:

each of said lock clamps having a central web;

each of said central webs having at least one sloped edge projecting therefrom and diverging towards the lock pin assembly.

15. The locking mechanism of claim 12, said first and second lock clamps further comprising:

each of said lock clamps having a central web;

each of said central webs having at least one sloped edge projecting therefrom and diverging towards the lock pin assembly.

16. The locking mechanism of claim 11 wherein said levers project outwardly from said floor channels when locked.

* * * * *